(12) United States Patent
Agrawal et al.

(10) Patent No.: US 9,760,600 B2
(45) Date of Patent: Sep. 12, 2017

(54) SERVING RECURRENT CALENDAR EVENTS

(71) Applicant: Google Inc., Mountain View, CA (US)

(72) Inventors: Tulika Agrawal, Zurich (CH); Magdalena Natalia Dukielska, Zurich (CH); Stefan Valentin Gheorghita, Zurich (CH)

(73) Assignee: Google Inc., Mountain View, CA (US)

( * ) Notice: Subject to any disclaimer, the term of this patent is extended or adjusted under 35 U.S.C. 154(b) by 394 days.

(21) Appl. No.: 14/154,889

(22) Filed: Jan. 14, 2014

(65) Prior Publication Data

US 2015/0199402 A1    Jul. 16, 2015

(51) Int. Cl.
*G06F 17/30* (2006.01)
*G06Q 10/10* (2012.01)

(52) U.S. Cl.
CPC .... *G06F 17/30424* (2013.01); *G06F 17/3053* (2013.01); *G06F 17/30321* (2013.01); *G06Q 10/109* (2013.01)

(58) Field of Classification Search
CPC ........ G06F 17/30864; G06F 17/30867; G06Q 30/02
USPC ........ 707/723, 500; 705/7.14, 7.18, 28, 319, 705/7.26
See application file for complete search history.

(56) References Cited

U.S. PATENT DOCUMENTS

| | | | |
|---|---|---|---|
| 6,621,767 B1 * | 9/2003 | Kattan | G04F 10/00 368/113 |
| 7,016,909 B2 | 3/2006 | Chan et al. | |
| 7,958,003 B2 * | 6/2011 | De Vries | G06Q 10/06 705/7.18 |
| 8,041,725 B2 * | 10/2011 | Grant | G06Q 10/109 707/754 |
| 8,375,099 B2 | 2/2013 | Carroll et al. | |
| 8,504,404 B2 | 8/2013 | Norton | |
| 8,554,561 B2 | 10/2013 | Dean et al. | |
| 8,751,492 B1 * | 6/2014 | Catane | G06Q 30/02 705/14.53 |
| 2003/0041076 A1 * | 2/2003 | Lucovsky | G06F 17/30896 715/227 |
| 2005/0192822 A1 * | 9/2005 | Hartenstein | G06Q 10/109 705/319 |

(Continued)

OTHER PUBLICATIONS

"Search Engine Indexing," Wikipedia, http://en.wikipedia.org/wiki/Search_engine_indexing, Jan. 7, 2014, 10 pages.

(Continued)

*Primary Examiner* — Jeffrey A Burke
*Assistant Examiner* — Thong Vu
(74) *Attorney, Agent, or Firm* — Brake Hughes Bellermann LLP

(57) ABSTRACT

Computer-implemented systems and methods are provided for indexing and serving calendar event information. In accordance with some embodiments, information common to, and unique among, instances of a recurrent event may be determined. A markup document and search document including the common information and unique information may be generated, and a search index may be updated. Also, in accordance with some embodiments, a search query may be received and parsed, and recurrent event information can be scored as a possible search result.

9 Claims, 17 Drawing Sheets

(56) References Cited

U.S. PATENT DOCUMENTS

| | | | |
|---|---|---|---|
| 2007/0220063 A1* | 9/2007 | O'Farrell | G06F 17/277 |
| 2008/0052203 A1* | 2/2008 | Beyer | G06Q 30/00 |
| | | | 705/28 |
| 2009/0048891 A1* | 2/2009 | Ottavi | H04L 41/5054 |
| | | | 705/7.26 |
| 2009/0248711 A1* | 10/2009 | Martinez | G06F 17/30067 |
| 2010/0293029 A1* | 11/2010 | Olliphant | G06Q 10/06314 |
| | | | 705/7.19 |
| 2011/0289422 A1* | 11/2011 | Spivack | G06Q 30/02 |
| | | | 715/739 |
| 2012/0023454 A1* | 1/2012 | Pieruschka | G06Q 10/109 |
| | | | 715/853 |
| 2013/0197957 A1* | 8/2013 | Nudd | G06Q 10/06311 |
| | | | 705/7.14 |
| 2014/0095990 A1* | 4/2014 | Blanchard | G06F 17/24 |
| | | | 715/255 |
| 2014/0280231 A1* | 9/2014 | Paruchuri | G06F 17/30038 |
| | | | 707/749 |

OTHER PUBLICATIONS

"How Google Works," GoogleGuide making searching even easier, http://www.googleguide.com/google_works.html, Feb. 2, 2007, 4 pages.

Brin et al., "The Anatomy of a Large-Scale Hypertextual Web Search Engine," Computer Networks and ISDN Systems 30, 107-117, 1998, 11 pages.

* cited by examiner

| Term | Documents |
|---|---|
| orange | Document 2, Document 6 |
| pizza | Document 1, Document 3 |
| pasta | Document 3, Document 4, Document 7 |
| snow | Document 5, Document 8 |

FIG. 1
(Prior Art)

title = lunch meeting description = meeting with co-workers comments = they have pizza on the menu today participants = Jim, Sally, Ryan location = cafeteria date = January 15, 2014 start time = 12:00 p.m.

end time = 1:00 p.m.

FIG. 3A
(Prior Art)

title = lunch meeting description = meeting with co-workers comments = they have pizza on the menu today participants = Jim, Sally, Ryan location = cafeteria start from = January 15, 2014 end on = January 14, 2015 start time = 12:00 p.m.

end time = 1:00 p.m.

recurrent = weekly on Mondays

FIG. 3B
(Prior Art)

title = project status meeting description = discuss progress on our project comments = remember that this is in Jack's office this week invited participants = Jack, Robert, Kim location = Jack's office start time = 12:00 p.m. on 01/22/2014 end time = 1:00 p.m. on 01/22/2014 url = http://www....2.com

FIG. 5B title = project status meeting description = discuss progress on our project invited participants = Jack, Robert, Kim location = conference room start time = 12:00 p.m. on 01/15/2014 end time = 1:00 p.m. on 01/15/2014 url = http://www....1.com recurrent = yes

FIG. 5A

| Commonalities | Differences (Instance 1) | Differences (Instance 2) |
|---|---|---|
| title = project status meeting | location = conference room | comments = remember that this is in Jack's office this week |
| description = discuss progress on our project | start time = 12:00 p.m. on 01/15/2014 | location = Jack's office |
| invited participants = Jack, Robert, Kim | end time = 1:00 p.m. on 01/15/2014 | start time = 12:00 p.m. on 01/22/2014 |
| | url = http://www. . . .1.com | end time = 1:00 p.m. on 01/22/2014 |
| | | url = http://www. . . .2.com |

610 — <Common information> title = project status meeting
description = discuss progress on our project
invited participants = Jack, Robert, Kim </Common information>

<Different information>

<div>

630 —
    location = conference room
    start time = 12:00 p.m. on 01/15/2014
    end time = 1:00 p.m. on 01/15/2014
    url = http://www. . . . 1.com 620 —
    </div>

<div>

640 —
    comments = remember this is in Jack's office this week
    location = Jack's office
    start time = 12:00 p.m. on 01/22/2014
    end time = 1:00 p.m. on 01/22/2014
    url = http://www. . . . 2.com </div>

. . .

</Different information>

810 — maindoc {
    start_token = 1
    end_token = 4
}

830 — subdoc1 {
    start_token = 5
    end_token = 7
    url = http://www. . . . 1.com
    start_time = 12:00 p.m. on 01/15/2014
    end_time = 1:00 p.m. on 01/15/2014
}

820
850 — subdoc2 {
    start_token = 8
    end_token = 11
    url = http://www. . . . 2.com
840 —     start_time = 12:00 p.m. on 01/22/2014
    end_time = 1:00 p.m. on 01/22/2014
}

| Term | Document Location Information |
|---|---|
| location | document 1 (tokens 5, 13) (appears twice), document 18 (...) |
| conference | document 1 (token 6) (appears once), document 201 (...) |
| room | document 1 (token 7) (appears once), ... |
| comments | document 1 (token 8) (appears once), ... |
| remember | document 1 (token 9) (appears once), ... |
| jack | document 1 (tokens 10, 14) (appears twice), ... |
| office | document 1 (tokens 11, 15) (appears twice), ... |
| week | document 1 (token 12) (appears once), ... |

SERVING RECURRENT CALENDAR EVENTS

BACKGROUND

Technical Field

The present disclosure relates to computerized systems and methods for data processing and, more generally, to search and information retrieval technologies. By way of example, and without limitation, the present disclosure relates to computerized systems and methods for indexing recurrent calendar event information, and for scoring and providing search results including this information.

Background

Use of information retrieval services, such as search engines, has grown significantly over the last decade. People can now submit queries and access information using a variety of devices, such as personal computers, laptops, tablets, personal digital assistants (PDAs), personal organizers, mobile phones, smart-phones, televisions, and other devices. Queries for information can be performed locally on a device, or over a network such as the Internet. With increased access to such technologies over a wide variety of devices, people have become more reliant than ever on applications and services for accessing desired information.

Many information retrieval systems, such as Internet search engines, operate by identifying terms of a search string, and comparing the identified terms against an index of documents. For example, a provider of search services may collect, parse, and store data from a collection of documents, such as web pages on the World Wide Web, in an index. The index may facilitate the fast and accurate retrieval of relevant documents based on queries from users. Without such an index, a search engine would have to scan through every document in the collection, which would require a lot of time and/or processing power for a large collection of documents.

Some search engines use an inverted index to identify documents that include a word or phrase matching a query term. An example of an inverted index 100 is illustrated in FIG. 1. By using an inverted index, a search engine can identify each document that contains each term of the query. For a search query including the term "pizza," for example, a search engine using the exemplary index of FIG. 1 would identify documents 1 and 3 as including this term. Once the documents containing a term are identified, they can be ranked based on one or more of a variety of factors, such as location of the term in the document, frequency of the appearance of the term in the document, etc.

An inverted index may be created by parsing each document in a collection to identify the terms included in the document. For example, computer systems can be programmed to identify certain sequences of characters as terms (e.g., words, phrases, or other elements, such as html code). The terms can then be associated with the document in the inverted index.

In addition to storing identified terms, the index may store other information regarding each term, such as a location of where the term appeared in the document, the part of speech of the term (e.g., noun, verb), etc. This additional information can be used in ranking documents, including web pages. For example, for a search query that includes two terms next to each other, such as "George Washington," location information may be used to rank a document having the terms located next to each other with a higher ranking than a document that also contains the two terms, but in different locations in the document.

In order to provide the ability to search the most current information on the Internet, search providers may continuously update the index. For example, search providers may continuously retrieve and index web pages to account for changes in documents, such as web pages. Such retrieval of web pages is known as "crawling" the web.

An example of a process 200 for returning web search results based on a query is illustrated in FIG. 2. In step 210, a query is sent from a client to a web server. In step 220, the terms of the query are sent to one or more index servers. The index servers identify which web pages contain each of the query terms. In step 230, the identified web pages may be retrieved from one or more servers. These web pages may be ranked in order of relevance based on a variety of factors, as noted above. Furthermore, a portion of the text, or "snippet," from the document may be retrieved for each of the search results. For example, a portion of the text surrounding the query term in the document may be retrieved as a snippet to provide a client with a context for a search result. In step 240, links to the documents may be provided as search results to the client, along with the snippets.

Web pages are not the only type of information stored on the Internet or accessible through search engines. Today, people store all types of information, including calendar information, documents, photos, social networking information, and much more. It would be useful to provide an index for the quick and accurate retrieval of this information using search engines. However, generating an index can be complicated for certain types of information. One area in which such complications occur is when trying to index and provide search capabilities for calendar events.

The use of electronic calendar programs is common today, and many people rely on electronic calendars to organize their daily commitments. Electronic calendars, such as Google Calendar, allow users to store calendar events on network servers, so that they can be retrieved from anywhere and from a variety of different devices. Such calendars typically allow various types of calendar events to be saved, modified, or deleted.

One type of calendar event is an event with a single occurrence at a particular date and time. Such an event may be stored as a data entry including attributes for information describing the event, such as a title of the event, description of the event, comments, list of participants attending the event, location of the event, date of the event, and start and end time of the event. An exemplary illustration of such a data entry is provided in FIG. 3A.

Another type of calendar event is a recurrent event. For example, a user may wish to schedule an event that occurs repeatedly, such as a meeting that occurs on Wednesday from 2:00 p.m. to 3:00 p.m. every week. Rather than requiring the user to create an entry for every instance of the recurring meeting, many calendar applications allow the user to enter the information for the event once, and to set an attribute that causes the event to recur at the desired interval. Such an event may be stored as a data entry including attributes for all of the information normally associated with a single event occurrence, as well as attributes indicating that the event recurs, a start and end day for the recurrence, and a pattern of its recurrence. Such a data entry may be called a master data entry. The calendar application can use the recurrence pattern to compute the individual dates of the event, as needed. An exemplary illustration of such a master data entry is provided in FIG. 3B.

As noted above, it would be useful to index calendar events in order to provide for the quick and accurate retrieval of calendar information. However, the existence of recurring calendar events makes it difficult to create such an index. Accordingly, an efficient solution is needed for indexing and providing information regarding recurrent calendar events.

SUMMARY

Embodiments of the present disclosure relate to computerized systems and methods for processing queries and retrieving information, such as calendar event information. In addition, embodiments of the present disclosure relate to solutions for storing and updating calendar event information in an indexing system, and for providing search and retrieval capabilities for such calendar event information. Examples of calendar events include recurrent calendar events.

In accordance with some embodiments of the present disclosure, computerized systems and methods are provided that identify instances of a recurring event, and that generate a document with a first section including information common to instances of the recurrent event, and a second section including information unique to instances of the recurrent event. Additional embodiments of the present disclosure provide computerized systems and methods for updating the document based on changes to an instance of the recurrent event, or to the recurring event itself. Still further embodiments of the present disclosure provide computerized systems and methods of scoring and providing calendar event search results. The embodiments presented herein also may be implemented to address one or more of the disadvantages of conventional systems and methods, such as those indicated above.

In accordance with the present disclosure, there is provided a computer-implemented method for providing searchable calendar event information. The method comprises operations performed by at least one processor. The operations include receiving first attributes for a first instance of an event, the first attributes indicating a time during which the first instance occurs and that the event recurs in time. The operations also include receiving second attributes for a second instance of the event, the second attributes indicating a time during which the second instance occurs. The operations further include identifying, from the first attributes and the second attributes, information common to both the first instance and the second instance of the event. The operations still further include generating a document with a first section including the common information and a second section comprising the time at which the first instance occurs and the time at which the second instance occurs.

Furthermore, in accordance with the present disclosure, there is provided a computer system for providing searchable calendar event information. The computer system comprises a memory device that stores a set of instructions, and at least one processor that executes the set of instructions. The at least one processor is configured to receive first attributes for a first instance of the event, the first attributes indicating a time during which the first instance occurs and that the event recurs in time. The at least one processor is also configured to receive second attributes for a second instance of the event, the second attributes indicating a time during which the second instance occurs. The at least one processor is further configured to identify, from the first attributes and the second attributes, information common to both the first instance and the second instance of the event. The at least one processor is still further configured to generate a document with a first section including the common information and a second section comprising the time at which the first instance occurs and the time at which the second instance occurs.

Additionally, in accordance with the present disclosure, there is provided a computer system for providing searchable calendar event information. The computer system comprises a memory device that stores a set of instructions, and at least one processor that executes the set of instructions. The at least one processor is configured to identify recurrent event information and store the recurrent event information as a single document. The document comprises a first section including information that is common to multiple instances of the recurrent event. The document also comprises a second section comprising a sub-document for each of multiple instances of the recurrent event, each of the sub-documents storing additional information for its corresponding instance of the recurring event, the additional information being information that is different from the common information.

Moreover, in accordance with the present disclosure, there is provided a computer-implemented method for providing calendar event search results. The method comprises operations performed by at least one processor. The operations include receiving a first indication of a start time of an initial instance in time of the event, and receiving a second indication of a start time of a last instance in time of the event. The operations also include receiving a third indication of a total number of instances of the event, and calculating a time interval at which the event recurs using the first indication, second indication, and third indication. The operations further include using the time interval to approximate a start time for a next instance in time of the event, and calculating a first score for the event based on the approximated start time.

Still further in accordance with the present disclosure, there is provided a computer system for serving calendar event search results. The computer system comprises a memory device that stores a set of instructions, and at least one processor that executes the set of instructions. The at least one processor is configured to receive a first indication of a start time of an initial instance in time of the event, and receive a second indication of a start time of a last instance in time of the event. The at least one processor is also configured to receive a third indication of a total number of instances of the event, and to calculate a time interval at which the event recurs using the first indication, second indication, and third indication. The at least one processor is further configured to use the time interval to approximate a start time for a next instance in time of the event, and to calculate a first score for the event based on the approximated start time.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which the disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

FIG. 1 illustrates an exemplary inverted index for documents.

FIG. 3A illustrates an exemplary data entry for a single occurrence of a calendar event.

FIG. 3B illustrates an exemplary data entry for a recurrent calendar event.

FIG. 5A illustrates exemplary event information of a first instance of a recurrent event, consistent with embodiments of the present disclosure.

FIG. 5B illustrates exemplary event information of a second instance of a recurrent event, consistent with embodiments of the present disclosure.

FIG. 5C illustrates an exemplary table including commonalities and differences between a first instance of a recurrent event and a second instance of a recurrent event, consistent with embodiments of the present disclosure.

FIG. 6 illustrates an exemplary markup document including information for a recurrent event, consistent with embodiments of the present disclosure.

FIG. 8 illustrates an exemplary search document including information for a recurrent event, consistent with embodiments of the present disclosure.

FIG. 9 illustrates an exemplary search index including terms and document location information for a recurrent event, consistent with embodiments of the present disclosure.

FIG. 12B illustrates an exemplary display of search results including additional event information, consistent with embodiments of the present disclosure.

DESCRIPTION OF EXEMPLARY EMBODIMENTS

Figure 2:
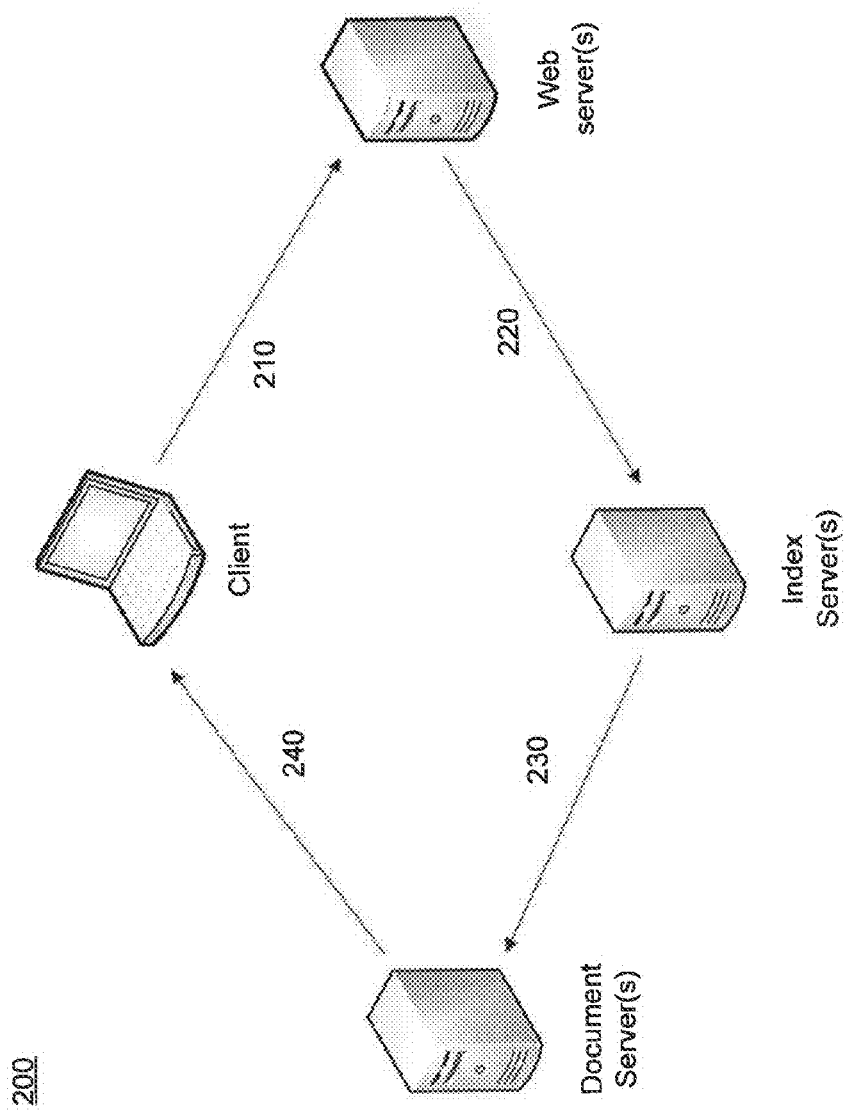
FIG. 2 illustrates an exemplary diagram of a process for returning web search results based on a query.

Reference will now be made in detail to the present embodiments of the disclosure, certain examples of which are illustrated in the accompanying drawings.

Embodiments of the present disclosure relate to computerized systems and methods for processing queries and retrieving information, such as calendar event information. Embodiments of the present disclosure include systems and methods for indexing calendar information, including recurrent calendar events. Such systems and methods may generate a single markup document and a single search document, each including information for instances of the recurring event. The markup document may include a first section including first information that is common among instances of the event, and a second section including second information that is unique to instances of the event. The search document may be generated by parsing the markup document, and may include information for searching for and scoring a recurrent event. The search document may include a first search document section including first search information that is common among instances of the event, and a second search document section including second search information that is unique to instances of the event. In addition, embodiments of the present disclosure encompass computer-implemented systems and methods for updating the markup document and search document based on updates to the indexed recurring events.

Embodiments of the present disclosure also encompass computer-implemented systems and methods for searching and scoring calendar event information. In addition, embodiments of the present disclosure encompass computer-implemented systems and methods for parsing a search query for calendar event information, and for serving calendar event information regarding one or more instances of a recurrent event as a search result for the query.

The existence of recurrent events presents some challenges to indexing calendar information. One way in which a recurrent event could be indexed would be to create a document for each instance of the recurring event, and to index each of these documents. However, creating a copy of the information for each instance of the recurring event is inefficient, because much of the information may be identical from instance to instance. Moreover, a recurrence pattern may be set in the recurrent event information, such that any number of instances may exist. Hundreds, or even thousands, of documents may need to be generated for such events. Storing all of this information unnecessarily takes up valuable storage space, and it takes longer and/or more processing power to search through all of this information. In some cases, hundreds or even millions of users may need to be supported. Creating an index by creating a document for each instance of a recurrent event is inefficient, particularly for providers of such heavily accessed search engines.

An additional problem may occur when serving search results based on recurrent events indexed in this manner. For example, a user may enter a term in a search query that is common among multiple instances of the recurrent event. Each of the multiple instances of the recurrent event containing this term may match the query, and the user's search results may be flooded with information from the recurrent event.

Embodiments of the present disclosure can address the challenges associated with searching for and serving calendar event information, including recurrent event information. For example, embodiments of the present disclosure provide computerized systems and methods that index recurrent calendar event information by generating a search document that includes a first search document section including first information that is common to instances of the recurring event, and a second search document section including second information that is unique to instances of the recurring event. By generating such a document, recurrent event information can be indexed without having to store and search through many copies of identical information. Embodiments of the present disclosure also provide computerized systems and methods for updating such search documents in response to updates to recurrent calendar event information. Additional embodiments of the present disclosure provide solutions for efficiently scoring and serving information from search documents. By using such documents, search providers can quickly and accurately identify relevant search results. This may provide increased customer satisfaction of a search provider's services, which may stimulate additional use of the search and/or related services.

As used herein, an "event" refers to an event that may occur one time, or that may occur repeatedly. An "instance" of an event refers to a single occurrence of the event. Thus, as used herein, an "event" will include at least one "instance" of the event, and may include multiple "instances" of the event.

In accordance with the embodiments described herein, a search provider may provide one or more server systems including a search engine for processing user search queries received over a network, such as the Internet. A search query may include one or more terms or phrases submitted by a user to search an available pool of information indexed by the server(s). The server(s) may receive a search query as a character string including one or more terms or phrases.

A character string may include a sequence of characters. The sequence of characters may include one or more alphanumeric characters, accented characters, diacritics, spaces, character returns, punctuation, and/or any other character commonly entered by a user with a keyboard and/or provided in a character-encoding scheme, such as American Standard Code for Information Interchange (ASCII) or UCS Transformation Format-8-bit (UTF-8). A character string may include one or more query terms or phrases entered by a user. For example, a character string may include one or more words, phrases, numbers, dates, abbreviations, and/or acronyms.

Figure 4:
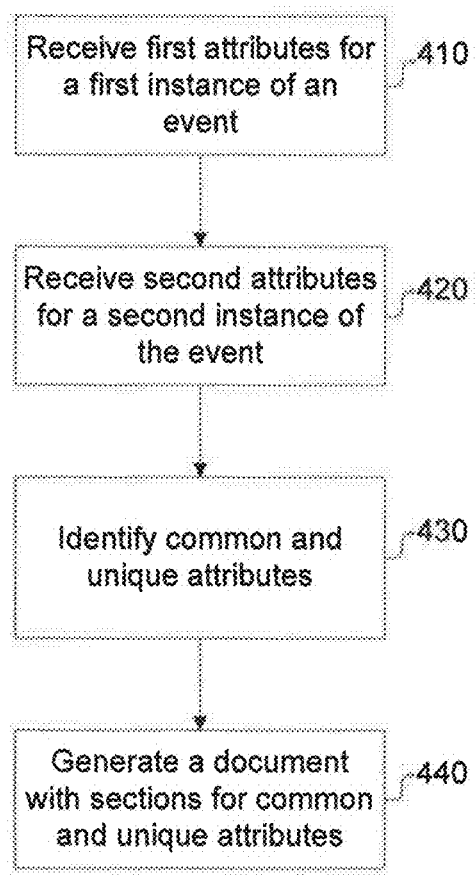
FIG. 4 illustrates an exemplary method for generating a markup document including information for a recurrent event, consistent with embodiments of the present disclosure.

FIG. 4 illustrates an exemplary method 400, consistent with embodiments of the present disclosure. Exemplary method 400 may be implemented in a computing environment (see, e.g., FIG. 13) using one or more computer systems (see, e.g., FIG. 14). In some embodiments, method 400 may be performed by one or more servers or computer systems associated with a search engine that is accessible to users over a network, such as the Internet.

In step 410, event information of a first instance of an event may be received. The event information may be received in the form of a data entry, such as a record or other data structure. The event information may include one or more attributes of the first instance of the event. In one embodiment, each of the attributes may include a field describing the type of attribute and a value for the attribute. The attributes may indicate one or more of a title of the event, description of the event, summary of the event, comments regarding the event, list of participants invited to the event, scheduled attendees of the event (e.g., those participants who accepted an invitation to attend the event), location of the event, start and end time of the event, status of the event (e.g., an indication that the event is cancelled), universal resource locator (URL) link to a displayable version of the event information, visibility of the event (e.g., whether there are restrictions on who can view the event), creation time of the event, modification time of the event, creator of the event, organizer of the event, and an original start time of the event. The attributes may also include an indication that the event is recurrent in time. A data entry with attributes indicating that the event is recurrent in time may be referred to as a "master" data entry. Exemplary event information of a first instance of the event is illustrated in FIG. 5A.

If the attributes indicate that the event is recurrent in time, method 400 may proceed to step 420, and event information of a second instance of the event may be received. For example, one or more computer systems (see, e.g., FIG. 14) implementing method 400 may request one or more other computer systems in the computing environment (see, e.g., FIG. 13) to generate and provide event information for another instance of the event (e.g., the next instance in time). The one or more other computer systems may include one or more servers providing calendar applications and/or storing user calendar event information. Alternatively, the one or more computer systems implementing method 400 may provide calendar applications and/or user calendar event information, and may receive the event information of the second instance of the event from one or more of its own servers and/or databases.

Alternatively, the event information received in step 410, in addition to including the indication that the event is recurrent, may include an indication of a pattern (e.g., time interval or frequency) at which the event recurs in time. With this pattern, the one or more computer systems (see, e.g., FIG. 14) implementing method 400 may calculate event information for another instance of the event. For example, the pattern describing the recurrence of the event may indicate that the event recurs on an annual basis, monthly basis, weekly basis, daily basis, or any other pattern that repeats in time. One or more computer systems implementing method 400 may use this pattern to generate another instance of the event.

For example, a pattern indicating that an event recurs on an annual basis (e.g., every one year, every two years, every five years, etc.) may indicate a time of day at which the event starts, date (e.g., day of the month) on which the event starts, month in which the event starts, and frequency with which the event repeats (e.g., every two years). Such a pattern may indicate, for example, that the event recurs starting at 1:00 p.m. on Mar. 4 every two years, starting with 1:00 p.m. on Mar. 4, 2014 (e.g., 1:00 p.m. on Mar. 4, 2014; 1:00 p.m. on Mar. 4, 2016; etc.).

A pattern indicating that an event recurs on a monthly basis (e.g., every one month, every two months, every six months, etc.) may indicate a time of day at which the event starts, date (e.g., day of the month) on which the event starts, and frequency with which the event repeats (e.g., every six months). Such a pattern may indicate, for example, that the event recurs on the 8th day every two months, starting at 2:00 p.m. on Feb. 8, 2014 (e.g., 2:00 p.m. on Feb. 8, 2014; 2:00 p.m. on Apr. 8, 2014; etc.). Alternatively, a pattern indicating that an event recurs on a monthly basis may indicate a time of day at which the event starts, day of the week (e.g., nth day of the week, where n is a number between 1 and 7), week of the month (e.g., nth week of the month), and frequency with which the event repeats (e.g., every 2 weeks, every three weeks, etc.). Such a pattern may indicate, for example, that the event recurs every second Friday, starting at 1:00 p.m. on the second Friday of April, 2014.

A pattern indicating that an event recurs on a weekly basis may indicate a start time at which the event starts, day of the week (e.g., nth day of the week, where n is a number between 1 and 7), and frequency with which the event repeats (e.g., every 1 week, every three weeks, etc.). Such a pattern may indicate, for example, that the event recurs on Wednesday every three weeks, starting at 1:00 p.m. on Wednesday, Jan. 15, 2014.

A pattern indicating that an event recurs on a daily basis may indicate a start time at which the event starts, and frequency with which the event repeats (e.g., every day, every 3 days, etc.). Such a pattern may indicate, for example, that the event recurs every three days, starting at 1:00 p.m. on Wednesday, Jan. 15, 2014.

Thus, as described above, an indication of a pattern can be used by one or more computer systems (see, e.g., FIG. 14) implementing method 400 to calculate event information for another instance of the event. However, it will be appreciated that an event could recur at any interval, not limited to those listed above. The one or more computer systems implementing method 400 may not be aware of and/or capable of computing additional instances based on all the patterns utilized for recurrent events. Moreover, it will be appreciated that other instances of an event may include exceptions to the pattern of recurrence, and/or modified and/or additional attributes that are not reflected in the event information of the first instance of the event. Accordingly, in some embodiments, the one or more computer systems implementing method 400 may receive the event information of the second instance of the event from one or more computer systems that provide calendar applications and/or store calendar information. In such embodiments, the event information for the second instance of the event received in step 420 may include a time and/or date that does not correspond to the pattern of recurrence, and/or may include additional and/or different attributes from those included in the event information of the first instance of the event.

In step 420, event information of the second instance of the event may be received. The event information may be received in the form of a data entry, such as a record or other data structure. The event information may include one or more attributes of the second instance of the event. In one embodiment, each of the attributes may include a field describing the type of attribute and a value for the attribute. The attributes may indicate one or more of a title of the event, description of the event, summary of the event, comments regarding the event, list of participants invited to the event, scheduled attendees of the event, location of the event, start and end time of the event, status of the event, URL link to a displayable version of the event information, visibility of the event, creation time of the event, modification time of the event, creator of the event, organizer of the event, and original start time of the event. Exemplary event information of a second instance of an event is illustrated in FIG. 5B.

In step 430, the attributes of the event information of the first instance (e.g., attributes of the master data entry) may be compared with the attributes of the event information of the second instance, and commonalities and differences among the attributes may be identified. For example, attribute fields and values of the event information of the first instance may be compared with attribute fields and values of the event information of the second instance. Differences in the fields between the event information of the first instance and second instance, and differences in the values between the event information of the first instance and the second instance, may be identified. Differences could include, for example, an exception to the recurrent event (e.g., a different location for a meeting in a particular week). FIG. 5C is an exemplary illustration of the commonalities and differences between the event information of the first instance illustrated in FIG. 5A and the event information of the second instance illustrated in FIG. 5B.

In step 440, a markup document may be generated with sections for listing the commonalities and differences between the event information of the first instance and the event information of the second instance. In one embodiment, the markup document is a HyperText Markup Language (HTML) or Extensible Markup Language (XML) document. An exemplary markup document 600 is illustrated in FIG. 6. The markup document may include a first section 610 listing all of the attributes that are common to the event information of the first instance and the event information of the second instance. The markup document may also include a second section 620 listing the attributes that are different between the event information of the first instance and the event information of the second instance. Second section 620 of the markup document may be generated to include a first sub-document portion 630 that lists all of the attributes that are unique to the event information of the first instance, and a second sub-document portion 640 that lists all of the attributes that are unique to the event information of the second instance.

In one embodiment, if the event information of the first instance of the event received in step 410 indicates that the event is recurrent in time, steps 420 and 430 may be repeated for every other instance of the event. That is, the attributes of the event information for every other instance of the event may be received and compared with the attributes of the event information of the first instance (e.g., the "master" instance) of the event. Differences in the fields between the event information of each instance and the event information of the first instance, and differences in the values between the event information of each instance and the event information of the first instance, may be identified. The markup document generated in step 440 may then be generated with a first section listing the attributes common between the event information of the first instance of the event and the event information of a certain number (e.g., a majority) of the other instances of the event, and a second section listing the attributes of the event information of each instance of the event that differ from the common attributes. For example, the second section may include a sub-document for each instance of the event, and each sub-document may store attributes of the event information that differ from the common attributes. In one embodiment, each of the sub-documents may be separated by <div> tags, as illustrated in FIG. 6.

Figure 7:
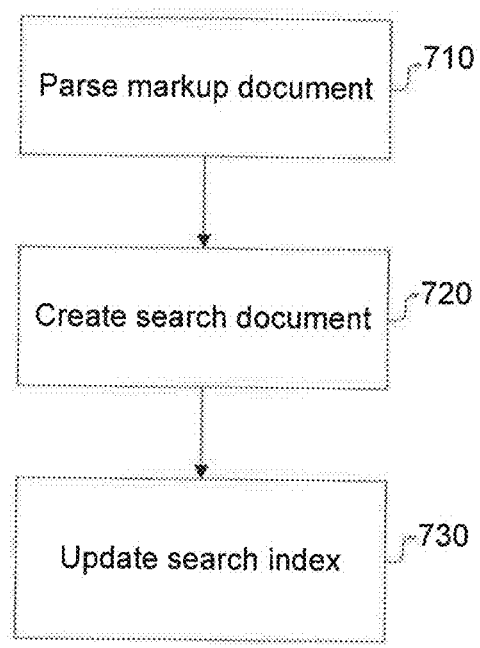
FIG. 7 illustrates an exemplary method for generating a search document and updating a search index based on recurrent event information, consistent with embodiments of the present disclosure.

FIG. 7 illustrates an exemplary method 700 for creating a search document based on the document generated by method 400. Similar to method 400, exemplary method 700 may be implemented in a computing environment (see, e.g., FIG. 13) using one or more computer systems (see, e.g., FIG. 14). Further, method 700 may be implemented on the same or different web server(s) or computer(s) associated with the other exemplary methods disclosed herein, including method 400.

In step 710, the markup document generated by method 400 may be parsed. For example, the markup document may be broken into terms by tokenizing the markup document based on predetermined character delimiters, such as a space or punctuation mark. There are many known methods for parsing a markup document to identify terms. It will be appreciated that one or more of these conventional parsing methods could be used in step 710. Moreover, it will be appreciated that one or more of these methods could be used to identify various characteristics of the terms, such as a term's case (upper, lower, mixed, proper), language, encoding, part of speech, position in document, sentence number, sentence position, length, line number, etc. In one embodiment, certain terms of the markup document may be identified as particular types of terms, such as, but not limited to, start times, end times, URL links, and/or keywords.

In step 720, a search document may be created to correspond to the markup document, with sections for listing the commonalities and differences between the event information of the first instance and the event information of the second instance. An exemplary search document is illustrated in FIG. 8. The search document may include a first search document section 810 corresponding to the first section of the markup document, and a second search document section 820 corresponding to the second section of the markup document. Second search document section 820 may include a first search sub-document 830 that may include attributes from the first sub-document of the markup document, such as the start time, end time, and URL link of the event information of the first instance of the event. The second search document section 820 may also include a second search sub-document 840 that may include attributes from the second sub-document of the markup document, such as the start time, end time, and URL link of the event information of the second instance of the event. In creating the search document, the search sub-documents may be identified by, for example, parsing the <div> tags that separate the sub-documents in the markup document.

Identifiers corresponding to other attributes included in the markup document may also be included in the first search document section and in each search sub-document of the second search document section. In one embodiment, these identifiers may be token numbers, such as token numbers 850, that identify the locations in which the attributes appear in the markup document. For example, each sub-document may store a start token number and an end token number to identify the range of locations in which the attributes for the sub-document appear in the markup document.

In step 730, a search index may be updated with the terms that were identified in parsing markup document 600. An exemplary search index 900 is illustrated in FIG. 9. Search index 900 may be an inverted index including a listing of terms from one or more markup documents. For example, search index 900 may include terms parsed from markup documents for one or more of single occurrences of events, recurrent occurrences of events, web pages, social networking information, or any other type of information that can be represented by a markup document, One of skill in the art will recognize that search index 900 may also include terms parsed from any other type of document. Any term identified from parsing any of the markup documents may be stored in search index 900 once, and may be associated with a list of markup documents in which the term was identified. Accordingly, if a term identified from parsing markup document 600 was not already included in search index 900, search index 900 will be updated to include that term. Each pairing between a term and a document in the listing of documents may also identify locations in which the term appeared in the paired document, and/or a number of times in which the term appeared in the paired document. In one embodiment, the locations may be stored as token numbers that correspond to the token numbers of search document 800. One of ordinary skill in the art would recognize that search index 900 may store a variety of other characteristics of one or more of the listed terms, including the term's case (e.g., upper, lower), language, encoding, part of speech, sentence number, sentence position, length, line number, etc. A search engine may use search index 900 to identify, for example, each document in which a term appears, each location in which the term appears in that document, and/or the number of times in which the term appears in that document.

Figure 10:
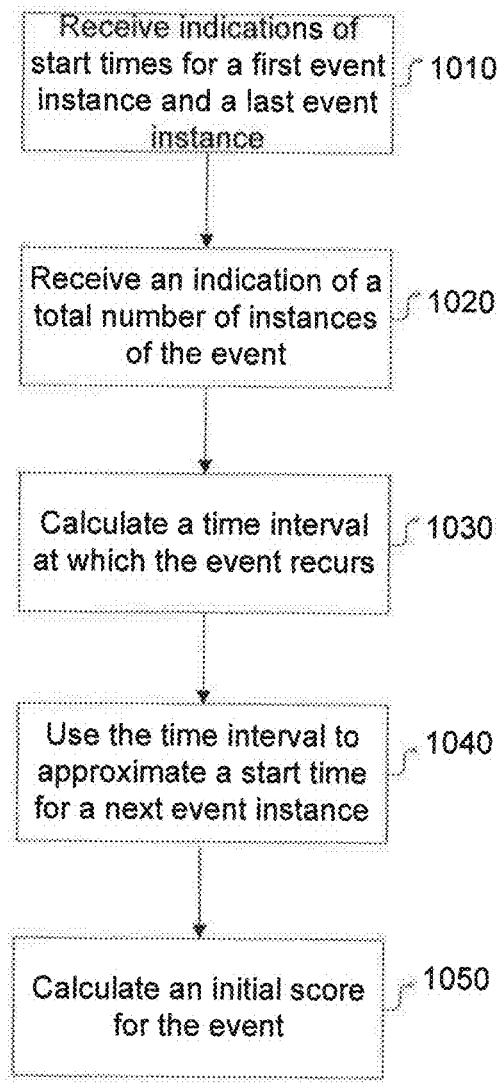
FIG. 10 illustrates an exemplary method for calculating an initial score for a recurrent event, consistent with embodiments of the present disclosure.

FIG. 10 illustrates an exemplary method 1000, consistent with embodiments of the present disclosure. Similar to methods 400 and 700, exemplary method 1000 may be implemented in a computing environment (see, e.g. FIG. 13) using one or more computer systems (see, e.g., FIG. 14). Further, method 1000 may be implemented on the same or different web server(s) or computer system(s) associated with the other exemplary methods disclosed herein, including methods 400 and 700.

In step 1010, an indication of a start time of a first instance of a recurrent event may be received and an indication of a start time of a last instance of the recurrent event may be received. In step 1020, an indication of a total number of instances of the recurring event may be received. One or more of the indications in steps 1010 and 1020 may be received by retrieving them from a search document generated by method 700, such as search document 800. The indications could also be retrieved from a markup document generated by method 400, such as markup document 600. Alternatively, one or more of the indications may have been determined and stored as part of method 400 or method 700, and could be retrieved from storage in steps 1010 and 1020.

In step 1030, an approximation of the interval at which the event recurs may be calculated. The interval may be calculated, for example, by subtracting the start time of the first instance from the start time of the last instance and dividing the result by the total number of instances of the event.

One or more of steps 1010-1030 of method 1000 may occur at any time after the event information of the instances is received. For example, in one embodiment, the system may identify the start time of the first instance, the start time of the last instance, and the total number of instances for the event when the event information is received in performing method 400, and the time interval can be calculated at that time, or at any time thereafter. The calculated time interval may then be stored in the markup document generated in step 440 of method 400, and/or in the search document generated in step 720 of method 700, for later retrieval by step 1040.

In step 1040, the calculated interval may be used to estimate a start time for a next instance of the event in the future. For example, if no time is specified in a search query, the calculated interval may be used to determine the start time for a next instance of the event immediately after the current time. If a time restriction is included in a search query, the calculated interval may be used to determine whether an instance of the event would fall within the time restriction if the instances repeated at the calculated interval.

In step 1050, the estimated start time for the next instance in the future of the event may be used to calculate an initial score for a search result, in accordance with method 1100, and as further described below.

Figure 11:
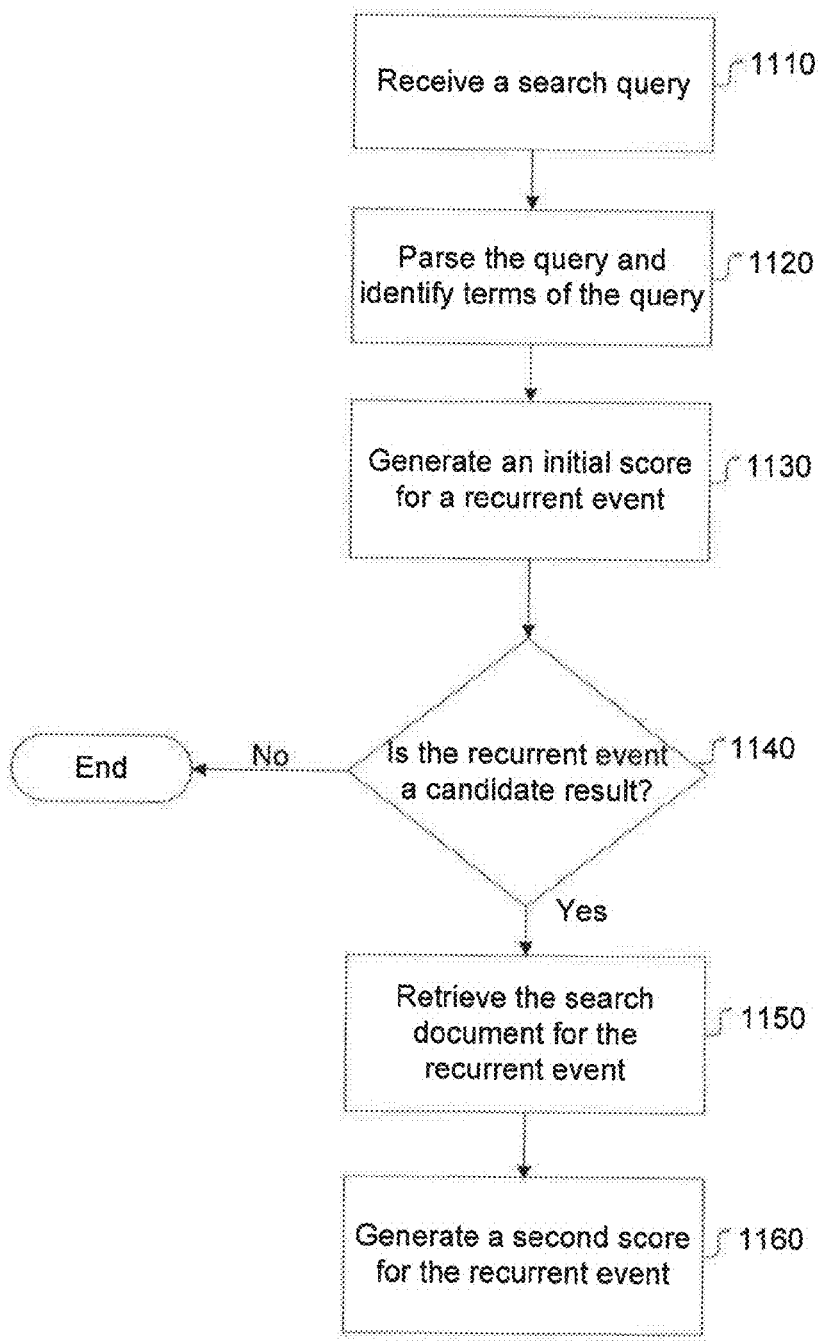
FIG. 11 illustrates an exemplary method for generating a second score for a recurrent event, consistent with embodiments of the present disclosure.

FIG. 11 illustrates an exemplary method 1100, consistent with embodiments of the present disclosure. Similar to methods 400, 700, and 1000, exemplary method 1100 may be implemented in a computing environment (see, e.g. FIG. 13) using one or more computer systems (see, e.g., FIG. 14). Further, method 1100 may be implemented on the same or different web server(s) or computer system(s) associated with the other exemplary methods disclosed herein, including methods 400, 700, and 1000.

In step 1110, a search query is received. The search query may include a character string entered by a user to search for information, and the character string may include one or more search terms. In step 1120, the character string may be parsed to identify the terms of the query. For example, the character string may be broken into terms by tokenizing the character string based on predetermined character delimiters, such as a space. There are many known methods and techniques for parsing a character string of a search query to identify search terms, such as natural language processing techniques. It will be appreciated that one or more of these methods could be used in step 1120. Moreover, it will be appreciated that one or more of these methods could be used to identify various characteristics of the terms, such as a term's case (upper, lower, mixed, proper), language, encoding, part of speech, position in the character string, length, etc. In one embodiment, certain terms of the character string may be identified as particular types of terms, such as keywords or time-based terms.

Terms of the search query may be compared with terms stored in a search index, such as search index 900. If one of the terms matches a term in the search index, the documents paired with that term may be returned, along with any other information that is associated with the pairing (e.g., locations of the term in the paired document, number of times the term appears in the document, etc.).

If one of the returned documents is a document for a recurrent event, such as markup document 600 or search document 800, then in step 1130 an initial score may be calculated for the recurrent event. The initial score may be calculated using method 1000, for example. Alternatively, an initial score may be generated by method 1000, and may be used in combination with one or more scores generated in another manner to determine the initial score of step 1130.

In step 1140, a determination can be made as to whether the recurrent event is a candidate search result based on the initial score generated in step 1130. This determination could be made, for example, by ranking the initial score against initial scores generated for other documents, and determining whether the initial score of the document falls within a number of documents that are ranked the highest. Alternatively, the determination could be made by identifying whether the initial score is higher than a predetermined threshold. There are many known methods and techniques for scoring search results. It will be appreciated that these known methods may be used to rank the initial scores of the documents to determine which of the documents are candidate search results. If it is determined that the recurrent event is not a candidate search result, the method may end. If it is determined that the recurrent event is a candidate search result, the method may proceed to step 1150.

In step 1150, a search document corresponding to the recurrent event, such as search document 800, may be retrieved. Actual start times or end times of instances of the recurrent event may be retrieved from the search document. For example, if a search query included a time restriction (e.g., meetings between Tuesday and Thursday), the search document can be analyzed to determine whether any instances of the recurrent event fall within the time restriction.

In step 1160, a score for an instance of the recurrent event can be generated based, at least in part, on the actual start and/or end times of the instance. For example, the system may analyze the search sub-documents of the search document to identify the actual start and/or end times of instances of the recurrent event, and may score the event instances based on the actual start and/or end times. For example, calendar event instances that occur in the near future may be considered to be more relevant search results. Accordingly, they may be given higher scores. If a search query includes a time restriction, calendar event instances with start and/or end times that fall within the time restriction may be scored higher than those with start and/or end times that do not.

The score generated in step 1160 may be one of many scores that are combined to determine a total score for a potential search result for the query. For example, a total score may be based on a variety of factors other than time, such as the location the term appears in a document, the frequency with which the term appears in the document, whether terms appearing next to each other in the query also appear next to each other in the document, etc. There are a variety of known natural language processing techniques that can be used to better identify a user's intent with a search query, and to evaluate and score documents as potential search results based on that intent. It will be appreciated that any of these techniques could be used for this purpose, as part of step 1160.

Three different example searches are described below to further explain how potential search results for various search queries may be scored based on the disclosure herein. In a first example search query, the query may include a keyword. In step 1110, the query may be received. In step 1120, the query may be parsed to identify the keyword. In step 1130, a search index, such as search index 900, may be referenced to identify the documents that the keyword appears in and the locations the keyword appears in each document. If one of the returned documents corresponds to a recurrent event, method 1000 may be used to estimate a time interval at which the event recurs, to generate an initial score for the event. In step 1140, this initial score may be used to rank this document as a candidate search result against other documents that matched the keyword. If it is determined that the recurrent event is a candidate search result, the search document corresponding to the recurrent event may be retrieved, along with the actual start times and end times of instances of the event. The actual start times and end times may be used to calculate a second score for the recurrent event. If the system determines that the event should be returned as a search result, the system may provide the event information for the instance considered to be the most relevant (e.g., the instance with a start time that is closest to the current time, or the instance whose sub-document contains the query keyword) as the search result.

In a second example search query, the query may include a keyword and a time restriction. For example, a user may search for "my project meeting tomorrow." In this case, the system can parse the query to identify the terms "my," "project," "meeting," and "tomorrow," The system may intelligently determine that the terms "my" and "meeting" refer to a calendar event for that particular user, and that the term "project" is a keyword for particular calendar event. The system may then use a search index, such as search index 900, to identify documents corresponding to "project"

calendar events for the user. The system may also intelligently determine that the term "tomorrow" corresponds to events that fall within a range between a particular start time and end time. For documents that are returned and that correspond to recurrent events, the system may use method 1000 to estimate a time interval at which the event recurs. The system may use the estimated time interval to determine whether the event is likely to recur within the identified time range, and to calculate an initial score for the event based on this determination. Method 1100 may then determine whether the event is a candidate event. If it is, method 1100 may retrieve the search document for the event, and determine the actual start and end times of instances of the recurrent event to determine whether instances of the event actually fall within the determined time range. The system may associate scores with the event based on whether instances of the event fall within the range, and based on where an instance falls within the range. For example, if multiple returned events fall within the range, an event instance falling earlier in time in the range (e.g., a project meeting in the morning tomorrow) may be considered to be more relevant, and may be given higher scores than a project meeting event instance falling later in the day tomorrow. Alternatively, upon analyzing the search document, the system may determine that the sub-documents containing the keyword "project" do not fall within the time frame corresponding to "tomorrow." In this case, the system may determine not to include any of the instances from the recurring event document in the search results.

In a third example search query, the query may include a keyword that matches a term in the common portion of a markup document for a recurrent event. In step 1110, the query may be received. In step 1120, the query may be parsed to identify the keyword. In step 1130, a search index, such as search index 900, may be referenced to identify the document that the keyword appears in and the location the keyword appears within the document (in this case, within the first section of the document that includes the information common to multiple instances of the event). Method 1000 may be used to estimate a time interval at which the event recurs, and to generate an initial score for the event. In step 1140, the score may be used to rank this document as a candidate search result against other documents that matched the keyword. If it is determined that the recurrent event is a candidate search result, the search document corresponding to the recurrent event may be retrieved, along with the actual start and end times of instances of the event. The actual start and end times may be used to calculate a second score for the recurrent event. If, based on the second score, the system decides to return the document for the recurrent event as a search result, the instance of the recurrent event with the start time closest to the current time may be deemed most relevant, and could be provided to the user as a search result.

In one embodiment, if a recurrent event is to be returned as a search result, only the event information for the instance of the recurrent event receiving the highest score may be provided as a search result (e.g., the instance appearing closest to the current time, or within a time restriction of the search query). For example, if the instance corresponding to second search sub-document 840 receives the highest score, the user may be provided with the start time of the instance (e.g., 12:00 p.m. on Jan. 22, 2014), the end time of the instance (e.g., 1:00 p.m. on Jan. 22, 2014), and the URL link (e.g., http://www. . . . 2.com) of the instance.

Additionally, the user may be provided with a "snippet" of text as part of the search result to provide a context for the instance of the event. For example, the system may identify text for the instance in a corresponding markup document, such as markup document 600, based on the start and end token numbers 850. The system may then, for example, select a text passage including a certain number of terms from either side of the term that matched the search query.

Figure 12A:
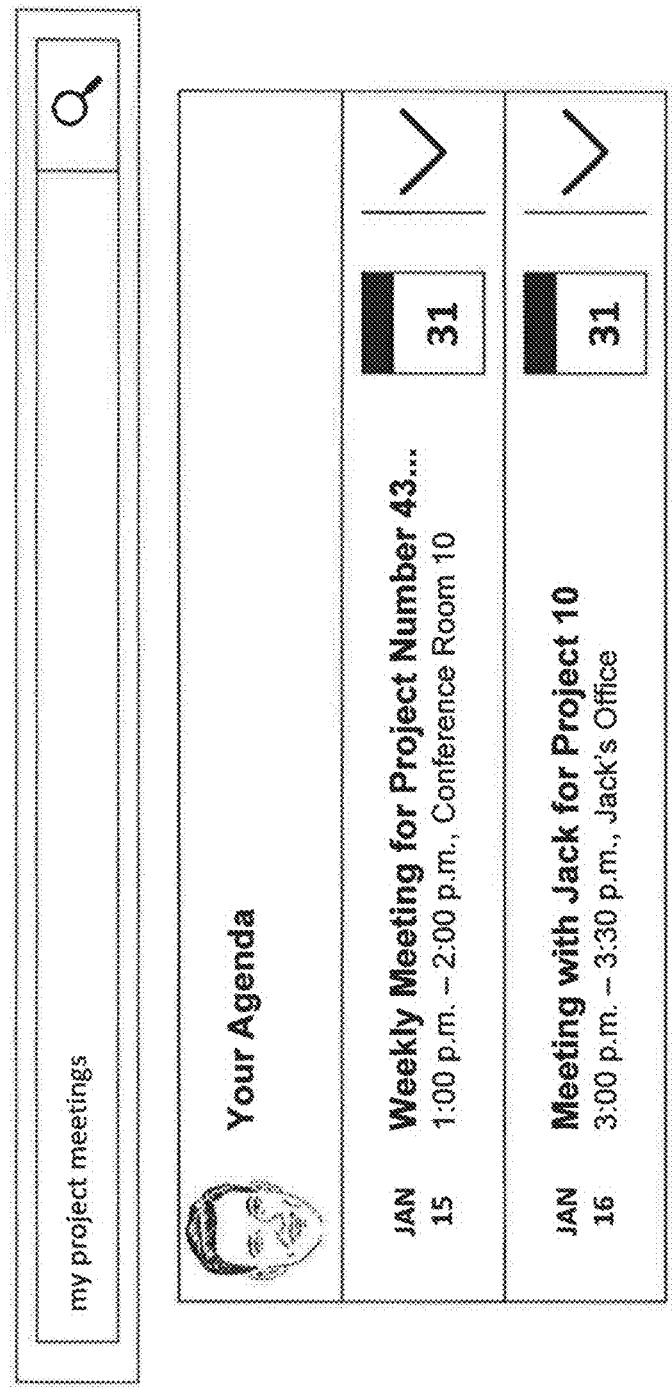
FIG. 12A illustrates an exemplary display of search results including event information, consistent with embodiments of the present disclosure.
Figure 12B:
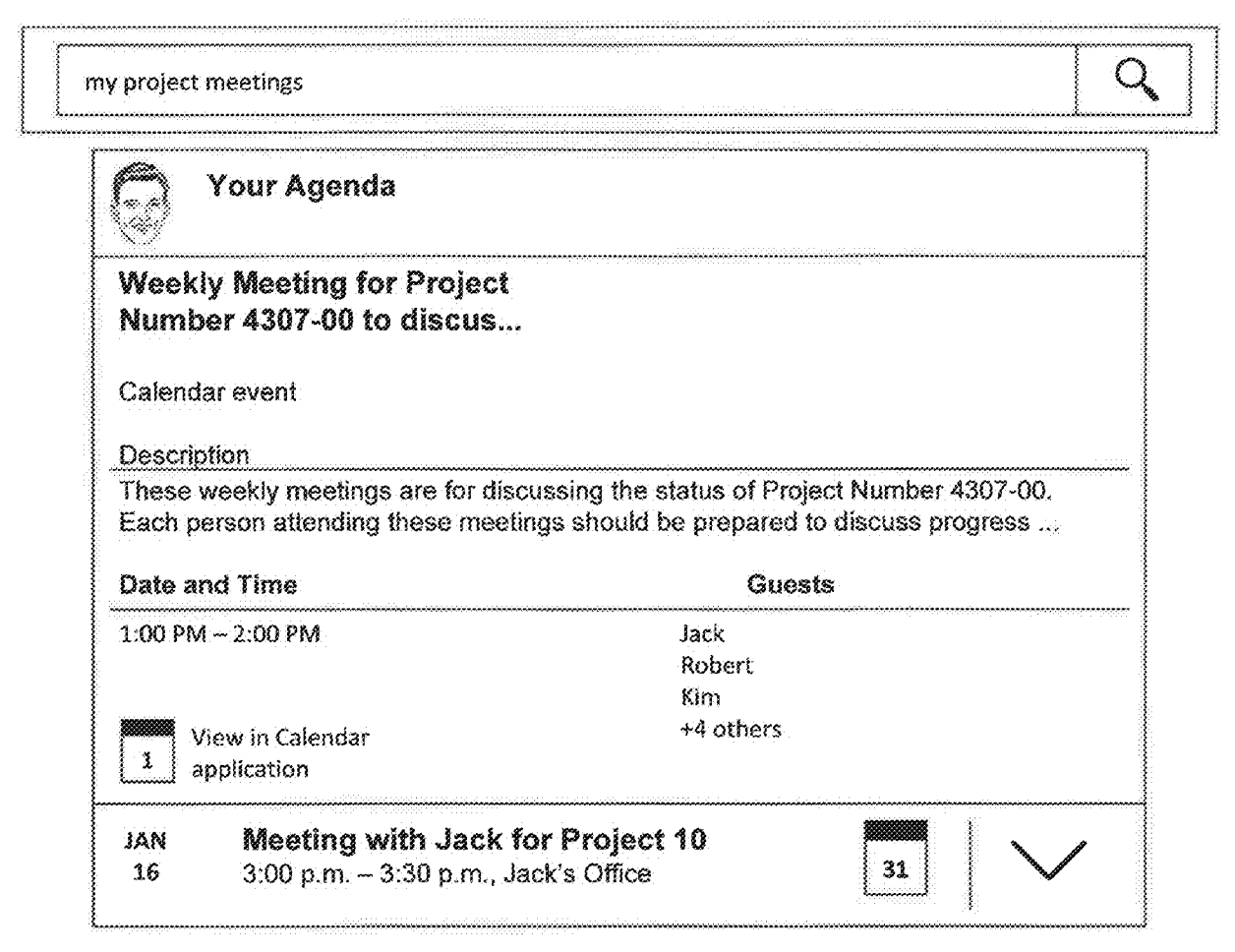
Figure 12C:
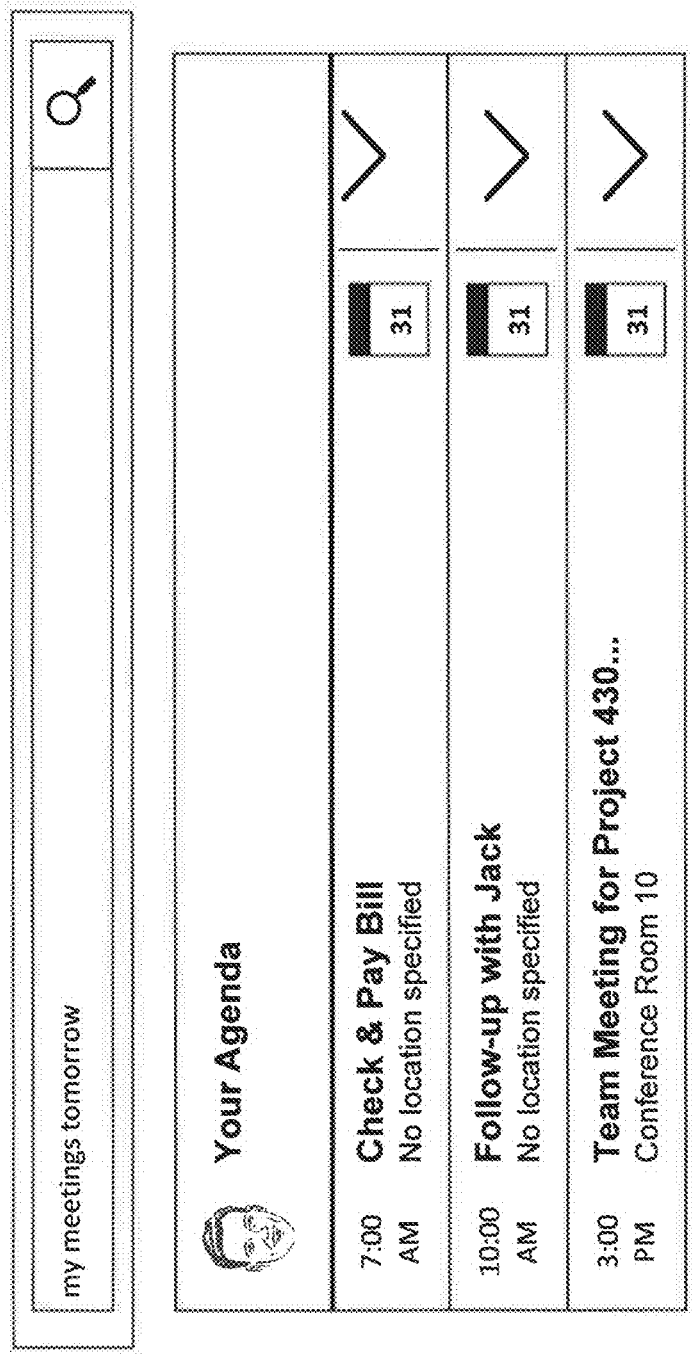
FIG. 12C illustrates an additional exemplary display of search results including event information, consistent with embodiments of the present disclosure.

FIGS. 12A-12C illustrate examples of a web page that displays calendar event search results, consistent with the embodiments disclosed herein. In FIG. 12A, a user may search for "my project meetings." In response, the system may provide search results including snippets for upcoming project meetings. In one embodiment, the search results may be ranked and sorted, so that the results that are determined to be most relevant are displayed at the top of the list of search results. In this case, the system may determine the first search result to be more relevant, because it occurs closer in time to the current time. In one embodiment, the user may click any of the search results to retrieve more information for the calendar event, such as the information illustrated in FIG. 12B.

FIG. 12B is an exemplary illustration of a display of calendar search results after the user clicks on a particular search result (in this case, the first search result in FIG. 12A). In this example, more information may be displayed for the calendar event search result that was clicked on, including the title, description, date and time, and invited guests. The information that may be displayed is not limited to the information shown in FIG. 12B. Indeed, any relevant calendar event information may be displayed. The information may also include a link to view the full information of the event in a calendar application. In one embodiment, the calendar application may be the calendar application in which the user initially scheduled the calendar event, though the disclosure is not so limited. The exemplary display illustrated in FIG. 12B also displays snippets for one or more additional search results that were not clicked on by the user.

In FIG. 12C, a user may search for "my meetings tomorrow." In response, the system may provide search results including snippets for calendar events that are on the user's calendar for tomorrow. In one embodiment, the search results may be ranked and sorted, so that the results that are determined to be most relevant are displayed at the top of the list of search results. In this case, the search query may only include "my meetings tomorrow." Accordingly, the system may determine that search results occurring earlier in the day are more relevant than those occurring later in the day, because they appear closer in time to the current time. In one embodiment, the user may click any of the search results to retrieve more information for the calendar event, such as the information illustrated in FIG. 12B.

Over time, information may be added, deleted, or modified for a recurring event, or for an instance of a recurrent event, in a calendar application. For example, a user may change a description, add a description to, or delete a description from, a recurrent event. A user could also delete a single instance of an event. For example, if a typical weekly meeting falls on a holiday, the user may wish to delete that instance of the event if, for example, the office will be closed that day. A user could also modify information for a single instance of an event. For example, if the weekly meeting for a particular week will be held in a different location. A user may also delete or change all future occurrences of the recurrent event. In addition, many other changes not listed above could be made by a user to a recurring event, or to an instance of a recurring event.

When a change is made to a recurring event, or an instance of a recurring event, a computer system providing the calendar application, or storing the calendar information, may notify the one or more computer systems (see, e.g., FIG. 14) that implement method 400. In response, the one or more computer systems that implement method 400 may recreate the markup document and search document using methods 400 and 700, respectively. Because this information has changed in the system implementing the calendar application or storing the calendar information, the changes will be automatically accounted for in the markup document and search document by recreating these documents using methods 400 and 700.

In an alternative embodiment, the one or more computer systems that implement method 400 may not be notified of the change, but may implement methods 400 and 700 on a periodic basis, such as hourly or daily. In one embodiment, this may occur on a periodic basis for all of the calendar information stored by a computer system. The more often this occurs, the more up-to-date the markup documents, search documents, and/or search indexes will be. For example, without receiving a notification that calendar information has changed, the markup documents, search documents, and/or search indexes may not reflect a change that was made by a user thirty minutes ago if these documents are updated on an hourly basis, for example.

Figure 13:
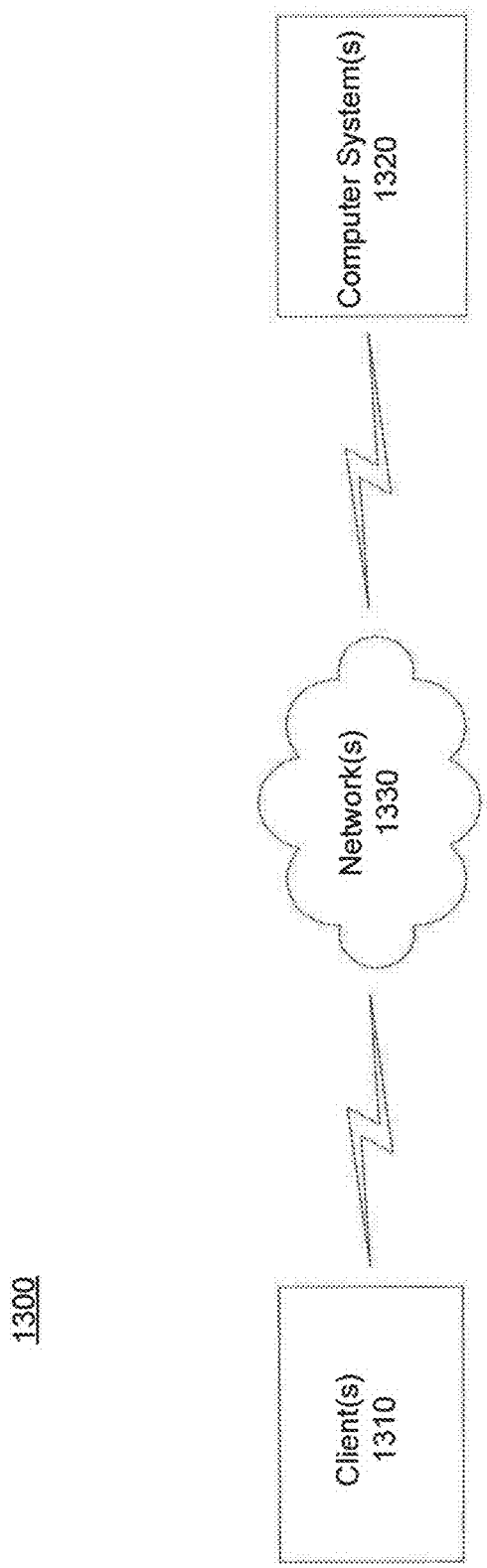
FIG. 13 illustrates an exemplary computing environment for implementing embodiments and features consistent with the present disclosure.

FIG. 13 is a diagram illustrating an exemplary computing environment 1300 for implementing embodiments consistent with the present disclosure, including the above-described exemplary methods and features. In computing environment 1300, a service provider or other entity may provide one or more computer system(s) 1320 that enable query and information retrieval services. By way of example, computer system(s) 1320 may include one or more servers, such as web servers, or other computing platforms for hosting web pages, indexing documents, and/or scoring documents. Computer system(s) 1320 may also host software applications that generate markup documents, search documents, and/or search indexes. Computer system(s) 1320 may further host software applications that handle and process user queries, score search results, rank search results, and/or provide search results to client devices, such as client(s) 1310. Computer system(s) 1320 may also include one or more back-end servers for carrying out one or more aspects of the present disclosure. In one embodiment, computer system(s) 1320 may be implemented using computer system 1400 of FIG. 14.

One or more networks 1330 may connect computer system(s) 1320 with one or more client device(s) 1310. Network(s) 1330 may provide for the exchange of information, such as search queries and results, between client device(s) 1310 and computer system(s) 1320. Network(s) 1330 may include one or more types of networks interconnecting computer system(s) 1320 with client device(s) 1310. For example, one client device 1310 may communicate with one or ore computer system(s) 1320 over a coaxial cable network, while a different client device 1310 may communicate with one or more computer system(s) 1320 over a cellular network, Networks) 1330 may include one or more wide area networks (WANs), metropolitan area networks (MANS), local area networks (LANs), or any combination of these networks. Network(s) 1330 may include a combination of a variety of different network types, including Internet, Ethernet, twisted-pair, coaxial cable, fiber optic, cellular, satellite, IEEE 802.11, terrestrial, and/or other types of network connections. In some embodiments, network 1330 comprises the Internet.

Client device(s) 1310 may include a variety of different types of computing devices capable of communicating with computer system(s) 1320 over network(s) 1330. These computing devices may include personal computers, laptops, personal digital assistants (PDAs), personal organizers, telephones, mobile phones, smart-phones, televisions, set-top boxes, tablet computers, servers, and/or other types of computing devices. A user may use more than one type of client device to communicate with computer system(s) 1320.

Figure 14:
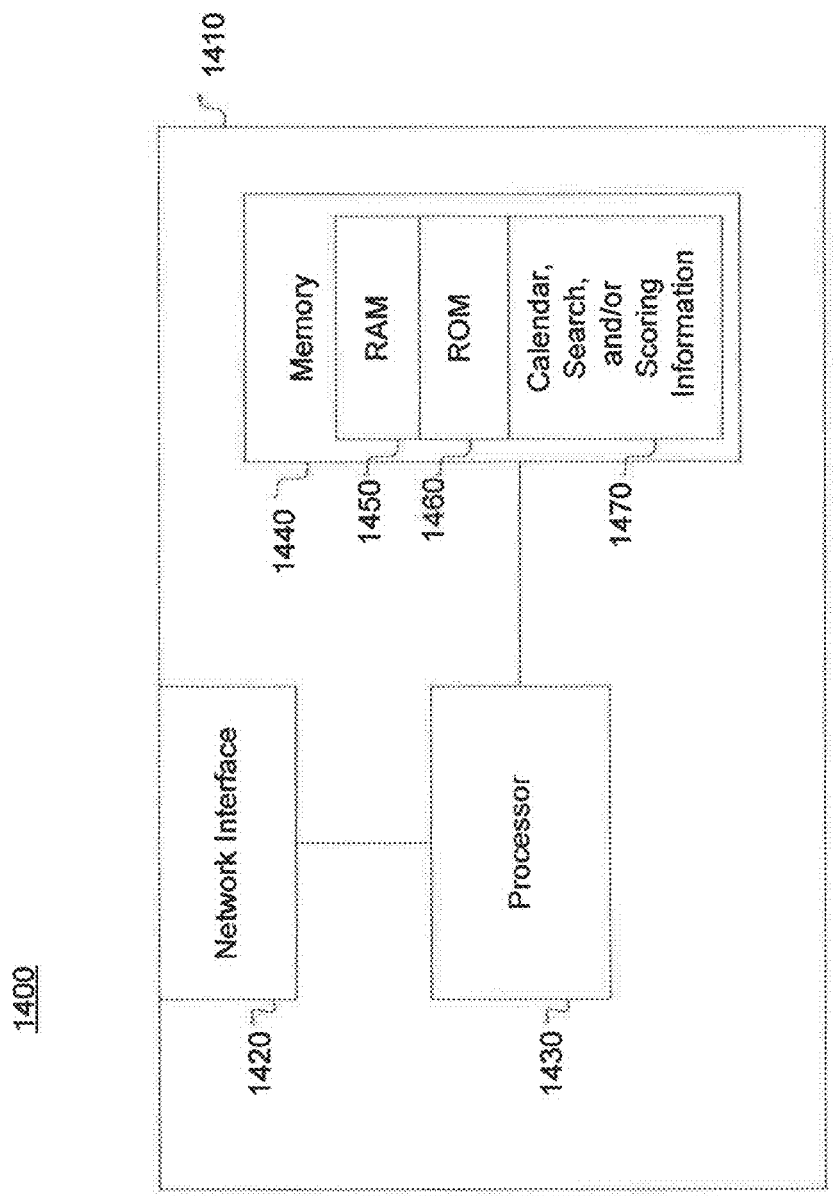
FIG. 14 illustrates an exemplary computer system for implementing embodiments and features consistent with the present disclosure.

FIG. 14 is a diagram illustrating an exemplary computer system(s) 1400 that may be used for implementing embodiments consistent with the present disclosure, including the exemplary systems and methods described herein. Computer system(s) 1400 may include one or more computers 1410, which may be servers, personal computers, and/or other types of computing devices. Each computer 1410 may include one or more processors 1430 that may be any suitable type of processor. Processor 1430 may be coupled to a network interface 1420 for receiving and/or transmitting data and/or commands to/from other devices over a variety of networks, such as Internet, Ethernet, twisted-pair, coaxial cable, fiber optic, cellular, satellite, IEEE 802.11, terrestrial, or other wired or wireless networks.

Processor 1430 may be coupled to one or more memory device(s) 1440. Each memory device 1440 may be configured to store instructions that, when executed by one or more processors 1430, carry out the methods and techniques consistent with the present disclosure, including the exemplary methods and techniques described herein. Memory device 1440 may also store an operating system, software applications, and/or parameters. Data stored on memory device 1440 may be stored in a single dedicated memory, or over a plurality of memory devices. Memory device 1440 may include any type of memory, physical, non-transient, volatile, or non-volatile, including, but not limited to, random access memory (RAM), 1450, read-only memory (ROM) 1460, magnetic strip storage, semiconductor storage, optical disc storage, and/or magneto-optical disc storage.

Memory device 1440 may also include one or more databases 1470 for storing search information, such as search documents, indexes, and/or any other information or data stored as a result of performing the disclosed methods, or required to perform the disclosed methods. For example, database(s) 1470 may store documents, such as markup documents, search documents, and/or search indexes, that include event information, as disclosed herein. One of skill would recognize that database(s) 1470 could also store additional information that could be provided as search results, such as web page information, electronic mail information, social networking information, or any other type of information. Processor 1430 may also be coupled to a computer providing a user interface for allowing input of information and commands to processor 1430 and/or allowing output of information and commands in a human-readable form.

Different aspects of the present disclosure could be performed by different computer(s) 1410, or different computer system(s) 1400. For example, a computer system 1400 implementing method 400 may receive calendar information from one or more different computer systems over a network. Any combination of methods 400, 700, 1000, and 1100 may be performed on the same computer system 1400. Alternatively, each of methods 400, 700, 1000, and 1100 may be performed on a different computer system.

As disclosed herein, recurrent event information may be received, and a single markup document may be created including a first section containing information common to instances of the recurrent event, and a second section containing information that is unique to instances of the recurrent event. The second section may contain a plurality of sub-documents. Each sub-document may include the unique information of an instance of the recurrent event. The markup document may be parsed and a search document may be created with a first search document section corresponding to the first section of the markup document, and a second search document section corresponding to the second section of the markup document, and including search sub-documents corresponding to the sub-documents of the markup document. Terms parsed from the markup document may also be used to update a search index. When changes are made to a recurrent event, or to an instance of the recurrent event, the markup document and search document may be recreated, and the search index may be updated.

As also disclosed herein, search queries may be received and parsed to identify terms of the search queries. Initial scores may be generated for search results corresponding to recurrent events by estimating a time corresponding to an instance of the recurrent event. If, based on the initial score, the recurrent event is determined to be a candidate search result, the search document corresponding to the recurrent event can be retrieved, and the actual start times and end times of instances of the recurrent event can be identified. The actual start and end times may be used to generate a second score for the recurrent event, and an instance of the recurrent event may be ranked and/or provided as a search result based on the second score.

The disclosed systems and methods provide a useful way of indexing recurrent event information, so that instances of a recurrent event can be quickly and accurately searched. Creating markup documents and search documents using the systems and methods disclosed herein allows the indexing of recurrent event information in a manner that may be integrated with other indexed information. Thus, the systems and methods provided herein may be used to provide a search engine that integrates a variety of different types of searchable information. For example, a user's search query may return calendar event search results, including recurrent event information, along with search results including web pages, social networking information, electronic mail information, or any other type of indexed information.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for providing calendar event search results, the method comprising the following operations performed by at least one processor:
    receiving a query, the query including a keyword and a time restriction;
    identifying a recurring event that includes the keyword;
    receiving a start time of an initial instance in time of the recurring event;
    receiving a start time of a last instance in time of the recurring event;
    receiving a total number of instances of the recurring event;
    calculating a time interval at which the recurring event recurs by subtracting the start time of the initial instance from the start time of the last instance and dividing the result by a number based on the total number of instances of the recurring event;
    using the time interval to approximate a start time for a next instance of the recurring event occurring after a current time; and
    calculating a first score for the recurring event based on the approximated start time of the next instance of the recurring event and the time restriction, the first score being inversely proportional to a difference between the approximated start time and the time restriction.

2. The method of claim 1, further comprising:
    determining that the recurring event is a candidate to return as a search result based on the calculated first score;
    retrieving information regarding the recurring event from a search document based on the determination, the information including an actual start time for the next instance in time for the recurring event; and
    calculating a second score for the recurring event based on the actual start time for the next instance and the time restriction.

3. The method of claim 2, wherein the method further comprises:
    matching the keyword to common attributes of instances of the recurring event;
    ranking search results including the common attributes based on the second score; and
    providing the search results in an order based on the ranking.

4. The method of claim 1, wherein the method further comprises:
    matching the keyword to a term in a search index;
    identifying one or more instances of the recurring event corresponding to the term; and
    providing search results including information regarding at least one of the one or more instances of the recurring event.

5. A computer system for serving calendar event search results, comprising:
    a memory device that stores a set of instructions; and
    at least one processor that executes the set of instructions and is configured to:
        receive a query, the query including a keyword and a time restriction;
        identify a recurring event that includes the keyword;
        receive a start time of an initial instance in time of the recurring event;
        receive a start time of a last instance in time of the recurring event;
        receive a total number of instances of the recurring event;
        calculate a time interval at which the event recurs by subtracting the start time of the initial instance from the start time of the last instance and dividing the result by a number based on the total number of instances of the recurring event;
        use the time interval to approximate a start time for a next instance of the recurring event occurring after a current time; and
        calculate a first score for the recurring event based on the approximated start time of the next instance of the recurring event and the time restriction, the first score being inversely proportional to a difference between the approximated start time and the time restriction.

6. The computer system of claim 5, wherein the at least one processor is further configured to:
   determine that the recurring event is a candidate to return as a search result based on the calculated first score;
   retrieve information regarding the recurring event from a search document based on the determination, the information including an actual start time for the next instance in time for the event; and
   calculate a second score for the recurring event based on the actual start time for the next instance and the time restriction.

7. The computer system of claim 6, wherein the at least one processor is further configured to:
   match the keyword to common attributes of instances of the recurring event;
   rank search results including the common attributes based on the second score; and
   provide the search results in an order based on the ranking.

8. The computer system of claim 5, wherein the at least one processor is further configured to:
   match the keyword to a term in a search index;
   identify one or more instances of the recurring event corresponding to the term; and
   provide search results including information regarding at least one of the one or more instances of the recurring event.

9. A memory device storing instructions that, when executed by one or more processors, cause a computer system to perform the following:
   receive a query, the query including a keyword and a time restriction;
   identify a recurring event that includes the keyword;
   receive a start time of an initial instance in time of the recurring event;
   receive a start time of a last instance in time of the recurring event;
   receive a total number of instances of the recurring event;
   calculate a time interval at which the event recurs by subtracting the start time of the initial instance from the start time of the last instance and dividing the result by a number based on the total number of instances of the recurring event;
   use the time interval to approximate a start time for a next instance of the recurring event occurring after a current time; and
   calculate a first score for the recurring event based on the approximated start time of the next instance of the recurring event and the time restriction, the first score being inversely proportional to a difference between the approximated start time and the time restriction.

* * * * *